(12) United States Patent
Xia et al.

(10) Patent No.: US 9,532,249 B2
(45) Date of Patent: Dec. 27, 2016

(54) METHOD FOR PROCESSING REFERENCE SIGNAL, USER EQUIPMENT, AND BASE STATION

(71) Applicant: Huawei Technologies Co., Ltd., Shenzhen (CN)

(72) Inventors: Liang Xia, Shenzhen (CN); David Mazzarese, Shenzhen (CN); Yongxing Zhou, Shenzhen (CN); Xiaotao Ren, Shenzhen (CN); Jingyuan Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 14/537,379

(22) Filed: Nov. 10, 2014

(65) Prior Publication Data

US 2015/0055503 A1  Feb. 26, 2015

Related U.S. Application Data

(63) Continuation of application No. PCT/CN2012/075351, filed on May 11, 2012.

(51) Int. Cl.
*H04W 24/08* (2009.01)
*H04L 5/00* (2006.01)
(Continued)

(52) U.S. Cl.
CPC .............. *H04W 24/08* (2013.01); *H04L 5/005* (2013.01); *H04L 5/0035* (2013.01);
(Continued)

(58) Field of Classification Search
None
See application file for complete search history.

(56) References Cited

U.S. PATENT DOCUMENTS

2007/0081480 A1   4/2007  Cai et al.
2011/0281536 A1  11/2011  Lee et al.
(Continued)

FOREIGN PATENT DOCUMENTS

CN    101326849 A    12/2008
CN    102334300 A     1/2012
(Continued)

OTHER PUBLICATIONS

"Discussion on Antenna Ports Co-location," 3GPP TSG RAN WG1 Meeting #68bis, Jeju, Korea, R1-121026, 3rd Generation Partnership Project, Valbonne, France (Mar. 26-30, 2012).
(Continued)

*Primary Examiner* — Gary Mui
(74) *Attorney, Agent, or Firm* — Leydig, Voit & Mayer, Ltd.

(57) ABSTRACT

The present invention provides a method for processing a reference signal, a user equipment, and a base station. The method includes: obtaining, by a UE, a first reference signal resource set, where the first signal resource set includes at least one first reference signal resource; and executing, by the UE, an operation of performing a co-location assumption process for at least one antenna port indicated by each first reference signal resource.

18 Claims, 2 Drawing Sheets

(51) Int. Cl.
*H04W 88/02* (2009.01)
*H04W 88/08* (2009.01)

(52) U.S. Cl.
CPC .......... *H04L 5/0048* (2013.01); *H04L 5/0053* (2013.01); *H04L 5/0023* (2013.01); *H04W 88/02* (2013.01); *H04W 88/08* (2013.01)

(56) References Cited

U.S. PATENT DOCUMENTS

| | | | | |
|---|---|---|---|---|
| 2013/0017833 A1* | 1/2013 | Sakamoto | ............ | H04J 11/0053 455/436 |
| 2013/0201840 A1* | 8/2013 | Sorrentino | .......... | H04L 25/0204 370/252 |
| 2013/0244676 A1* | 9/2013 | Koivisto | ............ | H04L 25/0224 455/452.1 |
| 2013/0279437 A1* | 10/2013 | Ng | ........................ | H04W 48/16 370/329 |

FOREIGN PATENT DOCUMENTS

| | | |
|---|---|---|
| CN | 102378196 A | 3/2012 |
| WO | WO 2006023423 A2 | 3/2006 |
| WO | WO 2011044530 A2 | 4/2011 |

OTHER PUBLICATIONS

"Co-located and non-colocated antenna ports," 3GPP TSG-RAN WG1 Meeting #68bis, Jeju, Korea, R1-121369, $3^{rd}$ Generation Partnership Project, Valbonne, France (Mar. 26-30, 2012).

* cited by examiner

METHOD FOR PROCESSING REFERENCE SIGNAL, USER EQUIPMENT, AND BASE STATION

CROSS-REFERENCE TO RELATED APPLICATIONS

This application is a continuation of International Patent Application No. PCT/CN2012/075351, filed on May 11, 2012, which is hereby incorporated by reference in its entirety.

TECHNICAL FIELD

The present invention relates to the field of communication technologies and, in particular, to a method for processing a reference signal, a user equipment, and a base station.

BACKGROUND

In a wireless communication system such as a Long Term Evolution (LTE) system, in order to enable a user equipment (UE) to measure the downlink channel state information (CSI), the reference signal received power (RSRP for short), the reference signal received quality (RSRQ for short), the timing synchronization information or channel statistic characteristics, etc., an access point (AP) needs to send certain reference signals (RS) used for measuring the CSI, i.e., the CSI-RS, to the UE in the coverage area, so that the UE can perform the measurements of CSI, RSRP, RSRQ, timing synchronization information or channel statistic characteristic, etc. By this time, the access point needs to send RS configuration information indicating RS resources to the UE, so that the UE can receive the RS by utilizing the RS configuration information, thereby utilizing the RS to perform the measurements. Because of the introduction of technologies such as coordinated multiple points (COMP), the UE may be serviced by a plurality of access points simultaneously, where each access point may be configured with a plurality of antenna ports, for example: 1, 2, 4 or 8 antenna ports or any other antenna ports quantities, the RS configuration information used for indicating the RS resources is sent to the UE through the antenna ports. Each RS resource indicated by the RS configuration information may include 1, 2, 4 or 8 antenna ports or any other antenna ports quantities, if 8 antenna ports are configured, their port serial numbers are {15,16,17,18,19,20,21,22}, respectively.

However, an RS resource may be mapped to a plurality of access points, which makes the UE cannot utilize the RS resource to perform the measurements and thus results in the decrease of the measuring capability of the UE.

SUMMARY

An embodiment of the present invention provides a method for processing a reference signal, a user equipment and a base station, so as to improve the measuring capability of the UE.

In one aspect, an embodiment of the present invention provides a method for processing a reference signal processing, where the method includes:
obtaining, by a UE, a first reference signal resource set, where the first signal resource set includes at least one first reference signal resource;
executing, by the UE, an operation of performing a co-location assumption process for at least one antenna port indicated by each first reference signal resource.

In another aspect, an embodiment of the present invention provides a method for processing a reference signal processing, where the method includes:
determining, by a base station, a first reference signal resource set, where the first signal resource set includes at least one first reference signal resource;
transmitting, by the base station, the first reference signal resource set to a UE, so that the UE executes an operation of performing a co-location assumption process for at least one antenna port indicated by each first reference signal resource.

In another aspect, an embodiment of the present invention provides a user equipment, where the user equipment includes:
an obtaining unit, configured to obtain a first reference signal resource set, where the first signal resource set includes at least one first reference signal resource;
a processor, configured to execute an operation of performing a co-location assumption process for at least one antenna port indicated by each first reference signal resource.

In another aspect, an embodiment of the present invention provides a base station, where the base station includes:
a processor, configured to determine a first reference signal resource set, where the first signal resource set includes at least one first reference signal resource;
a transmitter, configured to transmit the first reference signal resource set to a UE, so that the UE executes an operation of performing a co-location assumption process for at least one antenna port indicated by each first reference signal resource.

As can be seen from the aforementioned technical solutions, the embodiments of the present invention can solve the problem in the prior art that the UE fails to use the RS resource to perform measurements, where the problem is resulted from that an RS may be mapped to multiple access points, and thus the measuring capability of the UE is improved.

DESCRIPTION OF EMBODIMENTS

The technical solution of the present invention is hereinafter described in detail with reference to the accompanying drawings. It is evident that the embodiments are only some exemplary embodiments of the present invention, and the present invention is not limited to such embodiments. Other embodiments that are obtained by those skilled in the art based on embodiments of the present invention all fall within the protection scope of the present invention.

Technical solutions of the present invention may be applied in various communication systems, for example: the global system for mobile communications (GSM), the general packet radio service (GPRS) system, the code division multiple access (CDMA) system, the CDMA2000 system, the wideband code division multiple access (WCDMA) system, the long term evolution (LTE) system, and the world interoperability for microwave access (WiMAX) system, etc.

A base station, may be a base station (BTS for short) in the GSM system, the GPRS system, or the CDMA system, may also be a base station (NodeB) in the CDMA2000 system or the WCDMA system, may also be an evolved base station (eNB for short) in the LTE system, and may also be a base station (ASN BS for short) in the access service network of the WiMAX network, and etc.

An access point in embodiments of the present invention may be a remote radio head (RRH for short), or may also be a radio remote unit (RRU for short), or may also be an antenna unit (AU for short), which is not specified in embodiments of the present invention.

Furthermore, the term "and/or" in this document shows only an association relationship for describing associated objects, and indicates that three relationships may exist, for example, A and/or B may indicate the following three cases: A exists separately, and both A and B exist, and B exists separately. In addition, the character "/" in this document usually indicates that the former and later associated objects are in an "or" relationship.

Figure 1:
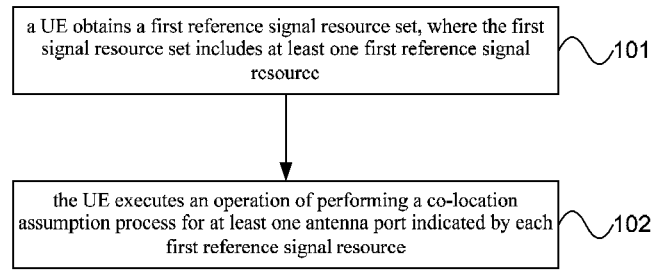
FIG. 1 is a schematic flowchart of a method for processing a reference signal according to an embodiment of the present invention.

FIG. 1 is a schematic flowchart of a method for processing a reference signal according to an embodiment of the present invention, as shown in FIG. 1.

101, a UE obtains a first reference signal resource set, where the first signal resource set includes at least one first reference signal resource.

102, the UE executes an operation of performing a co-location assumption process for at least one antenna port indicated by each first reference signal resource.

Optionally, in an optional implementation manner of the embodiment, in 101, the UE may obtain the preconfigured first reference signal resource set, for example: a protocol agreement. Specifically, the UE obtains the preconfigured first reference signal resource set, which may include but is not limited to at least one of the following situations:

the UE obtains a preconfigured reference signal resource set of an extended antenna port, where the reference signal resource set of the extended antenna port is used for measuring the RSRP, the RSRQ, the timing synchronization information or the channel statistic characteristic, the port serial number of the extended antenna port is greater than or equal to 23, the extended antenna port refers to a newly defined antenna port, for example: the port serial numbers of the antenna ports may be {23,24}, {25,26} or {23,24,25, 26}, etc.;

the UE obtains a preconfigured CoMP resource management collection, where the CoMP resource management collection is used for measuring the RSRP or the RSRQ; and the UE obtains a preconfigured synchronization reference signal resource set, where the synchronization reference signal resource set is used for measuring timing synchronization information.

Where, the reference signal resource of the extended antenna port may reuse a reference signal resource in the prior art, for example: a common reference signal (CRS) resource or a CSI-RS resource may be reused.

Where, the synchronization reference signal resource set may be a subset of the CoMP resource management collection.

Optionally, in an optional implementation manner of the embodiment, in 101, the UE may receive the first reference signal resource set transmitted by a base station. Specifically, the UE may receive the first reference signal resource set transmitted by the base station through a high layer signaling.

For example: specifically, the first reference signal resource set may be carried by an Information Element (IE) in a radio resource control (RRC) message, the RRC message may be an RRC message in the prior art, for example: an RRC connection reconfiguration message, etc., which is not specified in this embodiment, the first reference signal resource set may be carried by extending the IE in an existing RRC message, or the RRC message may be different from the RRC message in the prior art.

For another example: specifically, the first reference signal resource set may also be carried by adding a new media access control (MAC) control element (CE) message.

Optionally, in an optional implementation manner of the embodiment, before 102, the UE may further obtain an antenna port group corresponding to at least one antenna port indicated by each first reference signal resource, and port number or port serial numbers of the antenna ports included in the antenna port group; after that, determine the at least one antenna port indicated by each first reference signal resource according to the antenna port group, and the port number or the port serial number of the antenna port included in the antenna port group.

Where, the antenna port group may include 1, 2, 4, 8 antenna ports or other antenna ports quantity, each RS resource may include one or multiple antenna port groups. For example: a RS resource including 8 antenna ports may include 4 antenna port groups, where each antenna port group includes 2 antenna ports. Specifically, the port serial numbers of the antenna ports included in the 4 antenna port groups may respectively be {15,16}, {17,18}, {19,20}, {21,22}, and may also be {15,17}, {16,18}, {19,21}, {20, 22}, etc., which is not specified in this embodiment.

In further, optionally, the UE may obtain a preconfigured antenna port group corresponding to at least one antenna port indicated by each first reference signal resource, and the port number or the port serial numbers of the antenna ports included in the antenna port group, for example: a protocol agreement; or the UE may also receive an antenna port group corresponding to at least one antenna port indicated by each first reference signal resource, and the port number or the port serial numbers of the antenna port included in the antenna port group transmitted by the base station, specifically, the UE may also receive the antenna port group corresponding to at least one antenna port indicated by each first reference signal resource, and the port number or the port serial numbers of the antenna ports included in the antenna port group, which are transmitted by the base station through a high layer signaling.

Optionally, in an optional implementation manner of the embodiment, in 102, the executing the operation of performing the co-location assumption process for at least one antenna port indicated by each first reference signal resource by the UE, may specifically be that: the UE receives a reference signal indicated by each first reference signal resource corresponding to an antenna port executing the co-location assumption process by utilizing the antenna port, after that, the UE may perform the measurements by utilizing the received reference signal. Specifically, the UE may perform measurements of the RSRP, the RSRQ, the timing synchronization information or the channel statistic characteristic by utilizing the received reference signal. Where, the measurement of the timing synchronization information may include but is not limited to time synchronization, frequency synchronization, phase synchronization, calculating a time offset, calculating a frequency offset or calculating a phase offset; the measurement of the channel statistic characteristic may include but is not limited to measuring delay spread, Doppler spread or delay power profile.

Where, the co-location assumption process may include but is not limited to assuming that at least one of the following items is the same:

a geographical position of an antenna port;

a reference signal power corresponding to an antenna port received by a terminal;

a transmitting power of a reference signal corresponding to an antenna port;

an antenna gain experienced by a reference signal corresponding to an antenna port;

a large scale fading experienced by a reference signal corresponding to an antenna port;

a channel statistic characteristic, such as a power delay profile (PDP), experienced by a reference signal corresponding to an antenna port;

time that a reference signal corresponding to an antenna port arrives at a terminal;

transmitting time of a reference signal corresponding to an antenna port; and transmitting frequency of a reference signal corresponding to an antenna port.

Optionally, in an optional implementation manner of the embodiment, the UE may further obtain a second reference signal resource set, where the second signal resource set includes at least one second reference signal resource; correspondingly, the UE does not execute the operation of performing a co-location assumption process for the antenna port included in the at least one antenna port indicated by each second reference signal resource.

Optionally, in an optional implementation manner of the embodiment, the UE may obtain the preconfigured second reference signal resource set, for example: a protocol agreement. Specifically, the UE obtains a preconfigured CoMP measuring collection, where the CoMP resource management collection is used for measuring the CSI.

Optionally, in an optional implementation manner of the embodiment, the UE may receive the second reference signal resource set transmitted by a base station. Specifically, the UE may receive the second reference signal resource set transmitted by the base station through a high layer signaling.

For example: specifically, the second reference signal resource set may be carried by an Information Element (IE) in a radio resource control (RRC) message, the RRC message may be an RRC message in the prior art, for example: an RRC connection reconfiguration message, etc., which is not specified in this embodiment, the second reference signal resource set may be carried by extending the IE in an existing RRC message, or the RRC message may be different from the RRC message in the prior art.

For another example: specifically, the second reference signal resource set may also be carried by adding a new media access control (MAC) control element (CE) message.

Optionally, in an optional implementation manner of the embodiment, the UE does not execute the operation of performing a co-location assumption process for the antenna port included in the at least one antenna port indicated by each second reference signal resource, which may specifically be that, the UE receives a reference signal indicated by each of the second reference signal resources corresponding to an antenna port which does not execute the co-location assumption process by utilizing the antenna port, after that, the UE may perform the measurement of CSI by utilizing the received reference signal.

Optionally, in an optional implementation manner of the embodiment, the UE may further obtain an intersection set of the first reference signal resource set and the second reference signal resource set, where the intersection set includes at least one third reference signal resource; after that, the UE executes an operation of performing a co-location assumption process for at least one antenna port indicated by each third reference signal resource; or, the UE does not execute the operation of performing the co-location assumption process for the at least one antenna port indicated by each third reference signal resource.

In this embodiment, the UE obtains a first reference signal resource set, where the first signal resource set includes at least one first reference signal resource, and then the UE executes an operation of performing a co-location assumption process for at least one antenna port indicated by each first reference signal resource, therefore the problem in the prior art that the UE fails to use the RS resource to perform measurements can be solved, where the problem is resulted from that an RS may be mapped to multiple access points, and thus the measuring capability of the UE is improved.

Figure 2:
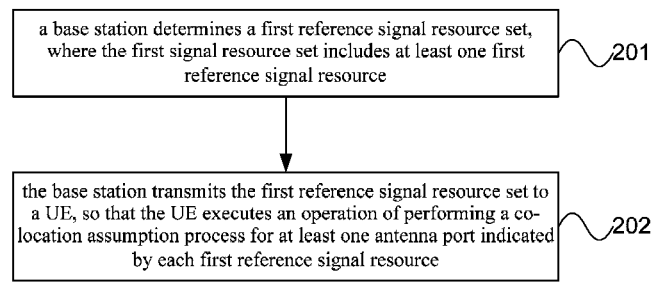
FIG. 2 is a schematic flowchart of a method for processing a reference signal according to another embodiment of the present invention.

FIG. 2 is a schematic flowchart of a method for processing a reference signal according to another embodiment of the present invention, as shown in FIG. 2.

201, a base station determines a first reference signal resource set, where the first signal resource set includes at least one first reference signal resource.

Specifically, a plurality of manners may be adopted for the base station to determine the first reference signal resource set, for example: the first reference signal resource set may be determined according to RS configuration information, etc., which is not specified in the embodiment.

For example: the base station may determine a reference signal resource set of an extended antenna port as the first reference signal resource set, where the reference signal resource set of the extended antenna port is used for measuring the RSRP, the RSRQ, the timing synchronization information or the channel statistic characteristic, the port serial number of the extended antenna port is greater than or equal to 23. Where, the reference signal resource of the extended antenna port reuse a CRS resource or a CSI-RS resource.

For another example: the base station may determine a CoMP resource management collection as the first reference signal resource set, where the CoMP resource management collection is used for measuring the RSRP or the RSRQ.

For another example: the base station may determine a synchronization reference signal resource set as the first reference signal resource set, where the synchronization reference signal resource set is used for measuring the timing synchronization information. Where, the synchronization reference signal resource set is a subset of the CoMP resource management collection.

202, the base station transmits the first reference signal resource set to a UE, so that the UE executes an operation of performing a co-location assumption process for at least one antenna port indicated by each first reference signal resource.

Optionally, in an optional implementation manner of the embodiment, in 202, the base station may transmit the first reference signal resource set to the UE through a high layer signaling.

For example: specifically, the first reference signal resource set may be carried by an Information Element (IE) in a radio resource control (RRC) message, the RRC message may be an RRC message in the prior art, for example: an RRC connection reconfiguration message, etc., which is not specified in this embodiment, the first reference signal resource set may be carried by extending the IE in an existing RRC message, or the RRC message may be different from the RRC message in the prior art.

For another example: specifically, the first reference signal resource set may also be carried by adding a new media access control (MAC) control element (CE) message.

Optionally, in an optional implementation manner of the embodiment, before 202, the base station may further transmit an antenna port group corresponding to at least one antenna port indicated by each first reference signal resource, and port number or port serial numbers of antenna ports included in the antenna port group to the UE, so that the UE determines the at least one antenna port indicated by each first reference signal resource according to the antenna port group, and the port number or the port serial numbers of the antenna ports included in the antenna port group. Specifically, the base station may transmit the antenna port group corresponding to the at least one antenna port indicated by each first reference signal resource, and the port number or the port serial numbers of the antenna ports included in the antenna port group to the UE through a high layer signaling.

Where, the antenna port group may include 1, 2, 4, 8 antenna ports or other antenna ports quantity, each RS resource may include one or multiple antenna port groups. For example: a RS resource including 8 antenna ports may include 4 antenna port groups, where each antenna port group includes 2 antenna ports. Specifically, the port serial numbers of the antenna ports included in the 4 antenna port groups may respectively be {15,16}, {17,18}, {19,20}, {21,22}, and may also be {15,17}, {16,18}, {19,21}, {20, 22}, etc, which is not specified in this embodiment.

Specifically, the description of executing the operation of performing the co-location assumption process for at least one antenna port indicated by each first reference signal resource by the UE may refer to related descriptions in the embodiment corresponding to FIG. 1, which is not repeated herein.

Optionally, in an optional implementation manner of the embodiment, the base station may further determine a second reference signal resource set, where the second signal resource set includes at least one second reference signal resource; after that, the base station transmits the second signal resource set to the UE, so that the UE does not execute the operation of performing a co-location assumption process for the antenna port included in the at least one antenna port indicated by each second reference signal resource.

Specifically, a plurality of manners may be adopted for the base station to determine the second reference signal resource set, for example: the second reference signal resource set is determined according to the RS configuration information, etc., which is not specified in the embodiment.

For example: the base station may determine a CoMP measuring collection as the second reference signal resource set, where the CoMP resource management collection is used for measuring the CSI.

Specifically, the base station may transmit the second reference signal resource set to the UE through a high layer signaling.

For example: specifically, the second reference signal resource set may be carried by an Information Element (IE) in a radio resource control (RRC) message, the RRC message may be an RRC message in the prior art, for example: an RRC connection reconfiguration message, etc., which is not specified in this embodiment, the second reference signal resource set may be carried by extending the IE in an existing RRC message, or the RRC message may be different from the RRC message in the prior art.

For another example: specifically, the second reference signal resource set may also be carried by adding a new media access control (MAC) control element (CE) message.

Specifically, the description of not executing the operation of performing a co-location assumption process for the at least one antenna port indicated by each first reference signal resource by the UE may refer to related descriptions in the embodiment corresponding to FIG. 1, which is not repeated herein.

In this embodiment, the base station determines a first reference signal resource set, where the first signal resource set includes at least one first reference signal resource, and then the base station transmits the first reference signal resource set to a UE, so that the UE executes an operation of performing a co-location assumption process for at least one antenna port indicated by each first reference signal resource, therefore the problem in the prior art that the UE fails to use the RS resource to perform measurements can be solved, where the problem is resulted from that an RS may be mapped to multiple access points, and thus the measuring capability of the UE is improved.

It should be noted that, in order to simplify the description, the forgoing method embodiments are expressed as a series of action combinations; however, persons skilled in the art should know that the present invention is not limited to the described action sequence because some steps may be performed in other sequences or performed at the same time on the basis of the present invention. Secondly, persons skilled in the art should also know that the embodiments described in the specification are exemplary embodiments, and the involved actions and modules are not indispensable parts of the present invention.

In the foregoing embodiments, each embodiment is described with a different emphasis; for the part not elaborated in an embodiment, reference may be made to related description in other embodiments.

Figure 3:
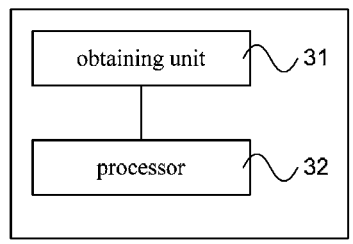
FIG. 3 is a schematic structural diagram of a user equipment according to another embodiment of the present invention.

FIG. 3 is a schematic structural diagram of a user equipment according to another embodiment of the present invention, as shown in FIG. 3, the user equipment in this embodiment may include an obtaining unit 31 and a processor 32. Where, the obtaining unit 31 is configured to obtain a first reference signal resource set; the processor 32 is configured to execute an operation of performing a co-location assumption process for at least one antenna port indicated by each first reference signal resource.

Figure 4:
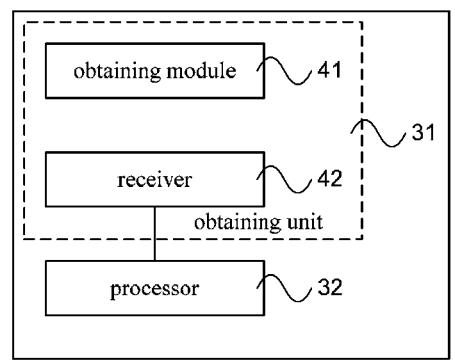
FIG. 4 is a schematic structural diagram of a user equipment according to another embodiment of the present invention.

Optionally, in an optional implementation manner of the embodiment, as shown in FIG. 4, the obtaining unit 31 may include an obtaining module 41 or a receiver 42.

Where, the obtaining module 41 is configured to obtain the preconfigured first reference signal resource set, for example: a protocol agreement. Specifically, the obtaining module 41 obtains the preconfigured first reference signal resource set, which may include but is not limited to at least one of the following situations:

obtain a preconfigured reference signal resource set of an extended antenna port, the reference signal resource set of the extended antenna port is used for measuring the RSRP, the RSRQ, the timing synchronization information or the channel statistic characteristic, the port serial number of the extended antenna port is greater than or equal to 23;

obtain a preconfigured CoMP resource management collection, where the CoMP resource management collection is used for measuring the RSRP or the RSRQ; and obtain a preconfigured synchronization reference signal resource set, where the synchronization reference signal resource set is used for measuring timing synchronization information.

Where, the reference signal resource of the extended antenna port may reuse a reference signal resource in the prior art, for example: a common reference signal (CRS) resource or a CSI-RS resource may be reused.

Where, the synchronization reference signal resource set may be a subset of the CoMP resource management collection.

Where, the receiver 42 is configured to receive the first reference signal resource set transmitted by a base station. Specifically, the receiver 42 may receive the first reference signal resource set transmitted by the base station through a high layer signaling.

For example: specifically, the first reference signal resource set may be carried by an Information Element (IE) in a radio resource control (RRC) message, the RRC message may be an RRC message in the prior art, for example: an RRC connection reconfiguration message, etc., which is not specified in this embodiment, the first reference signal resource set may be carried by extending the IE in an existing RRC message, or the RRC message may be different from the RRC message in the prior art.

For another example: specifically, the first reference signal resource set may also be carried by adding a new media access control (MAC) control element (CE) message.

Optionally, in an optional implementation manner of the embodiment, the processor 32 may specifically receive a reference signal indicated by each of the first reference signal resources corresponding to an antenna port executing the co-location assumption process by utilizing the antenna port, and performs the measurements by utilizing the received reference signal, where the measurements includes measurements of the RSRP, the RSRQ, the timing synchronization information or the channel statistic characteristic. Where, the measurement of the timing synchronization information may include but is not limited to time synchronization, frequency synchronization, phase synchronization, calculating a time offset, calculating a frequency offset or calculating a phase offset; the measurement of the channel statistic characteristic may include but is not limited to measuring delay spread, Doppler spread or delay power profile.

Where, the co-location assumption process may include but is not limited to assuming that at least one of the following items is the same:

a geographical position of an antenna port;

a reference signal power corresponding to an antenna port received by a terminal;

a transmitting power of a reference signal corresponding to an antenna port;

an antenna gain experienced by a reference signal corresponding to an antenna port;

a large scale fading experienced by a reference signal corresponding to an antenna port;

a channel statistic characteristic, such as a power delay profile (PDP), experienced by a reference signal corresponding to an antenna port;

time that a reference signal corresponding to an antenna port arrives at a terminal;

transmitting time of a reference signal corresponding to an antenna port; and transmitting frequency of a reference signal corresponding to an antenna port.

Optionally, in an optional implementation manner of the embodiment, the obtaining unit 31 is further configured to obtain an antenna port group corresponding to at least one antenna port indicated by each first reference signal resource, and port number or port serial numbers of antenna ports included in the antenna port group; the processor 32 is further configured to determine the at least one antenna port indicated by each first reference signal resource according to the antenna port group, and the port number or the port serial numbers of antenna ports included in the antenna port group.

Optionally, in an optional implementation manner of the embodiment, the obtaining module 41 may be specifically configured to obtain a preconfigured antenna port group corresponding to at least one antenna port indicated by each first reference signal resource, and the port number or the port serial numbers of the antenna ports included in the antenna port group, for example: a protocol agreement; the receiver 42 may be specifically configured to receive an antenna port group corresponding to at least one antenna port indicated by each first reference signal resource, and the port number or the port serial numbers of the antenna port included in the antenna port group transmitted by the base station. Specifically, the receiver 42 may receive the antenna port group corresponding to at least one antenna port indicated by each first reference signal resource, and the port number or the port serial numbers of the antenna ports included in the antenna port group, which are transmitted by the base station through a high layer signaling.

Where, the antenna port group may include 1, 2, 4, 8 antenna ports or other antenna ports quantity, each RS resource may include one or multiple antenna port groups. For example: a RS resource including 8 antenna ports may include 4 antenna port groups, where each antenna port group includes 2 antenna ports. Specifically, the port serial numbers of the antenna ports included in the 4 antenna port groups may respectively be {15,16}, {17,18}, {19,20}, {21,22}, and may also be {15,17}, {16,18}, {19,21}, {20, 22}, etc., which is not specified in this embodiment.

Optionally, in an optional implementation manner of the embodiment, the obtaining unit 31 is further configured to obtain a second reference signal resource set, where the second signal resource set includes at least one second reference signal resource; the processor 32 is further configured to do not execute the operation of performing a co-location assumption process for the antenna port included in the at least one antenna port indicated by each second reference signal resource.

Optionally, in an optional implementation manner of the embodiment, the obtaining module 41 may specifically obtain the preconfigured second reference signal resource set, for example: a protocol agreement. Specifically, the obtaining module 41 may obtain a preconfigured CoMP measuring collection, where the CoMP measuring collection is configured to measure the CSI. The receiver 42 may be specifically configured to receive the second reference signal resource set transmitted by a base station. Specifically, the receiver 42 may receive the second reference signal resource set transmitted by the base station through a high layer signaling.

For example: specifically, the second reference signal resource set may be carried by an Information Element (IE) in a radio resource control (RRC) message, the RRC message may be an RRC message in the prior art, for example: an RRC connection reconfiguration message, etc., which is not specified in this embodiment, the second reference signal resource set may be carried by extending the IE in an existing RRC message, or the RRC message may be different from the RRC message in the prior art.

For another example: specifically, the second reference signal resource set may also be carried by adding a new media access control (MAC) control element (CE) message.

Optionally, in an optional implementation manner of the embodiment, the processor 32 may specifically receive a reference signal indicated by each of the second reference signal resources corresponding to an antenna port which does not execute the co-location assumption process by utilizing the antenna port, and perform the measurement of CSI by utilizing the received reference signal.

Optionally, in an optional implementation manner of the embodiment, the obtaining unit 31 is further configured to obtain an intersection set of the first reference signal resource set and the second reference signal resource set, where the intersection set includes at least one third reference signal resource; the processor 32 is further configured to execute an operation of performing a co-location assumption process for at least one antenna port indicated by each third reference signal resource; or not execute the operation of performing the co-location assumption process for the at least one antenna port indicated by each third reference signal resource.

In this embodiment, the UE obtains a first reference signal resource set through an obtaining unit, where the first signal resource set includes at least one first reference signal resource by the UE, and then a process executes an operation of performing a co-location assumption process for at least one antenna port indicated by each first reference signal resource, therefore the problem in the prior art that the UE fails to use the RS resource to perform measurements can be solved, where the problem is resulted from that an RS may be mapped to multiple access points, and thus the measuring capability of the UE is improved.

Figure 5:
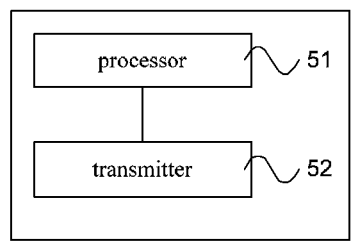
FIG. 5 is a schematic structural diagram of a base station according to another embodiment of the present invention.

FIG. 5 is a schematic structural diagram of a base station according to another embodiment of the present invention, as shown in FIG. 5, the base station in this embodiment may include a processor 51 and a transmitter 52. Where, the processor 51 is configured to determine a first reference signal resource set, the first signal resource set includes at least one first reference signal resource; the transmitter 52 is configured to transmit the first reference signal resource set to a UE, so that the UE executes an operation of performing a co-location assumption process for at least one antenna port indicated by each first reference signal resource.

Specifically, a plurality of manners may be adopted for the processor 51 to determine the first reference signal resource set, for example: the first reference signal resource set may be determined according to RS configuration information, etc., which is not specified in the embodiment.

For example: the processor 51 may determine a reference signal resource set of an extended antenna port as the first reference signal resource set, where the reference signal resource set of the extended antenna port is used for measuring the RSRP, the RSRQ, the timing synchronization information or the channel statistic characteristic, the port serial number of the extended antenna port is greater than or equal to 23. Where, the reference signal resource of the extended antenna port reuse a CRS resource or a CSI-RS resource.

For another example: the processor 51 may determine a CoMP resource management collection as the first reference signal resource set, where the CoMP resource management collection is used for measuring the RSRP or the RSRQ.

For another example: the processor 51 may determine a synchronization reference signal resource set as the first reference signal resource set, where the synchronization reference signal resource set is used for measuring the timing synchronization information. Where, the synchronization reference signal resource set is a subset of the CoMP resource management collection.

Optionally, in an optional implementation manner of the embodiment, the transmitter 52 may transmit the first reference signal resource set to the UE through a high layer signaling.

For example: specifically, the first reference signal resource set may be carried by an Information Element (IE) in a radio resource control (RRC) message, the RRC message may be an RRC message in the prior art, for example: an RRC connection reconfiguration message, etc., which is not specified in this embodiment, the first reference signal resource set may be carried by extending the IE in an existing RRC message, or the RRC message may be different from the RRC message in the prior art.

For another example: specifically, the first reference signal resource set may also be carried by adding a new media access control (MAC) control element (CE) message.

Optionally, in an optional implementation manner of the embodiment, the transmitter 52 may further transmit an antenna port group corresponding to at least one antenna port indicated by each first reference signal resource, and port number or port serial numbers of antenna ports included in the antenna port group to the UE, so that the UE determines the at least one antenna port indicated by each first reference signal resource according to the antenna port group, and the port number or the port serial numbers of the antenna ports included in the antenna port group. Specifically, the transmitter 52 may transmit the antenna port group corresponding to the at least one antenna port indicated by each first reference signal resource, and the port number or the port serial numbers of the antenna ports included in the antenna port group to the UE through a high layer signaling.

Where, the antenna port group may include 1, 2, 4, 8 antenna ports or other antenna ports quantity, each RS resource may include one or multiple antenna port groups. For example: a RS resource including 8 antenna ports may include 4 antenna port groups, where each antenna port group includes 2 antenna ports. Specifically, the port serial numbers of the antenna ports included in the 4 antenna port groups may respectively be {15,16}, {17,18}, {19,20}, {21,22}, and may also be {15,17}, {16,18}, {19,21}, {20,22}, etc, which is not specified in this embodiment.

Specifically, the description of executing the operation of performing the co-location assumption process for at least one antenna port indicated by each first reference signal resource by the UE may refer to related descriptions in the embodiment corresponding to FIG. 1, which is not repeated herein.

Optionally, in an optional implementation manner of the embodiment, the processor 51 may further determine a second reference signal resource set, where the second signal resource set includes at least one second reference signal resource; correspondingly, the transmitter 52 transmits the second signal resource set to the UE, so that the UE does not execute the operation of performing a co-location assumption process for the antenna port included in the at least one antenna port indicated by each second reference signal resource.

Specifically, a plurality of manners may be adopted for the processor 51 to determine the second reference signal resource set, for example: the second reference signal resource set is determined according to the RS configuration information, etc., which is not specified in the embodiment.

For example: the processor 51 may determine a CoMP measuring collection as the second reference signal resource set, where the CoMP resource management collection is used for measuring the CSI.

Specifically, the transmitter 52 may transmit the second reference signal resource set to the UE through a high layer signaling.

For example: specifically, the second reference signal resource set may be carried by an Information Element (IE) in a radio resource control (RRC) message, the RRC message may be an RRC message in the prior art, for example: an RRC connection reconfiguration message, etc., which is not specified in this embodiment, the second reference signal resource set may be carried by extending the IE in an existing RRC message, or the RRC message may be different from the RRC message in the prior art.

For another example: specifically, the second reference signal resource set may also be carried by adding a new media access control (MAC) control element (CE) message.

Specifically, the description of not executing the operation of performing a co-location assumption process for the at least one antenna port indicated by each first reference signal resource by the UE may refer to related descriptions in the embodiment corresponding to FIG. 1, which is not repeated herein.

In this embodiment, the base station determines a first reference signal resource set through the determining unit, where the first signal resource set includes at least one first reference signal resource, and then the transmitter transmits the first reference signal resource set to a UE, so that the UE executes an operation of performing a co-location assumption process for at least one antenna port indicated by each first reference signal resource, therefore the problem in the prior art that the UE fails to use the RS resource to perform measurements can be solved, where the problem is resulted from that an RS may be mapped to multiple access points, and thus the measuring capability of the UE is improved.

It may be clearly understood by a person skilled in the art that, for the purpose of convenient and brief description, a detailed working process of the foregoing system, apparatus, and unit may refer to the corresponding process in the foregoing method embodiments, and the details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not be performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit are implemented in a form of a software functional unit and sold or used as an independent product, the integrated unit may be stored in a computer-readable storage medium. The software functional unit is stored in a storage medium, and includes several instructions for instructing a computer device (which may be a personal computer, a server, or a network device) to perform all or a part of the steps of the methods described in embodiments of the present invention. The foregoing storage medium includes: any medium that can store program codes, such as a USB flash disk, a removable hard disk, a read-only memory (ROM), a random access memory (RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that he may still make modifications to the technical solutions described in the foregoing embodiments, or make equivalent replacements to some technical features thereof, without departing from the spirit and scope of the technical solutions of the embodiments of the present invention.

What is claimed is:

1. A method for processing a reference signal, comprising:
    obtaining, by a user equipment (UE), a first reference signal resource set, wherein the first signal resource set comprises at least one first reference signal resource;
    executing, by the UE, a co-location assumption process for at least one antenna port indicated by each first reference signal resource;
    obtaining, by the UE, a second reference signal resource set, wherein the second signal resource set comprises at least one second reference signal resource; and
    receiving, by the UE, a reference signal indicated by each second reference signal resource corresponding to an antenna port which does not execute a co-location assumption process utilizing the antenna port, and performing, by the UE, a measurement of channel state information (CSI) utilizing the received reference signal.

2. The method according to claim 1, wherein the obtaining, by the UE, the first reference signal resource set, comprises:
    obtaining, by the UE, a preconfigured first reference signal resource set; or
    receiving, by the UE, the first reference signal resource set transmitted by a base station.

3. The method according to claim 2, wherein the obtaining, by the UE, the preconfigured first reference signal resource set, comprises at least one of the following:

obtaining, by the UE, a preconfigured reference signal resource set of an extended antenna port, wherein the reference signal resource set of the extended antenna port is used for measuring a reference signal received power (RSRP), a reference signal received quality (RSRQ), timing synchronization information or a channel statistic characteristic, and wherein a port serial number of the extended antenna port is greater than or equal to 23;

obtaining, by the UE, a preconfigured coordinated multiple points (CoMP) resource management collection, wherein the CoMP resource management collection is used for measuring an RSRP or an RSRQ; and obtaining, by the UE, a preconfigured synchronization reference signal resource set, wherein the synchronization reference signal resource set is used for measuring timing synchronization information.

4. The method according to claim 1, wherein before the executing, by the UE, the co-location assumption process for the at least one antenna port indicated by each first reference signal resource, the method further comprising:

obtaining, by the UE, an antenna port group corresponding to the at least one antenna port indicated by each first reference signal resource, and a port number or a port serial number of an antenna port comprised in the antenna port group;

determining, by the UE, the at least one antenna port indicated by each first reference signal resource according to the antenna port group, and the port number or the port serial number of the antenna port comprised in the antenna port group.

5. The method according to claim 1, wherein the obtaining, by the UE, the second reference signal resource set, comprises:

obtaining, by the UE, a preconfigured second reference signal resource set; or receiving, by the UE, the second reference signal resource set transmitted by a base station.

6. The method according to claim 1, wherein the co-location assumption process comprises assuming that at least one following item is the same:

a geographical position of an antenna port;
a reference signal power corresponding to an antenna port received by a terminal;
a transmitting power of reference signal corresponding to an antenna port;
an antenna gain experienced by a reference signal corresponding to an antenna port;
a large scale fading experienced by a reference signal corresponding to an antenna port;
a channel statistic characteristic, including a power delay profile PDP, experienced by a reference signal corresponding to an antenna port;
a time that a reference signal corresponding to an antenna port arrives at a terminal;
a transmitting time of a reference signal corresponding to an antenna port; and
a transmitting frequency of a reference signal corresponding to an antenna port.

7. A method for processing a reference signal, comprising:
determining, by a base station, a first reference signal resource set, wherein the first signal resource set comprises at least one first reference signal resource;
transmitting, by the base station, the first reference signal resource set to a user equipment (UE), to enable the UE to execute a co-location assumption process for at least one antenna port indicated by each first reference signal resource;

determining, by the base station, a second reference signal resource set, wherein the second signal resource set comprises at least one second reference signal resource; and sending, by the base station, the second signal resource set to the UE, to enable the UE to not execute a co-location assumption process for an antenna port comprised in at least one antenna port indicated by each second reference signal resource.

8. The method according to claim 7, wherein the determining, by the base station, the first reference signal resource set, comprises at least one of the following:

determining, by the base station, a reference signal resource set of an extended antenna port, wherein the reference signal resource set of the extended antenna port is used for measuring a reference signal received power (RSRP), a reference signal received quality (RSRQ), timing synchronization information or a channel statistic characteristic, and wherein a port serial number of the extended antenna port is greater than or equal to 23;

determining, by the base station, a coordinated multiple points (CoMP) resource management collection, wherein the CoMP resource management collection is used for measuring an RSRP or an RSRQ; and determining, by the base station, a synchronization reference signal resource set, wherein the synchronization reference signal resource set is used for measuring timing synchronization information.

9. The method according to claim 7, further comprising:
transmitting, by the base station and to the UE, an antenna port group corresponding to at least one antenna port indicated by each first reference signal resource, and a port number or a port serial number of an antenna port comprised in the antenna port group, to enable the UE to determine the at least one antenna port indicated by each first reference signal resource according to the antenna port group, and the port number or the port serial number of the antenna port comprised in the antenna port group.

10. A user equipment, comprising
a processor and a non-transitory processor-readable medium having processor-executable instructions stored thereon, the processor-executable instructions including a plurality of units, the units including: an obtaining unit, configured to obtain a first reference signal resource set, wherein the first signal resource set comprises at least one first reference signal resource; and a processor, configured to execute a co-location assumption process for at least one antenna port indicated by each first reference signal resource;

wherein the obtaining unit is further configured to obtain a second reference signal resource set, wherein the second signal resource set comprises at least one second reference signal resource;

the processor is further configured to by means of an antenna port not executing a co-location assumption processing, receive a reference signal indicated by each second reference signal resource corresponding to an antenna port which does not execute a co-location assumption process utilizing the antenna port, and perform a measurement of channel state information (CSI) utilizing the received reference signal.

11. The user equipment according to claim 10, wherein the obtaining unit comprises:
- an obtaining module, configured to acquire a preconfigured first reference signal resource set; or
- a receiver, configured to receive a first reference signal resource set transmitted by a base station.

12. The user equipment according to claim 11, wherein the obtaining, by the obtaining module, the preconfigured first reference signal resource set, comprises at least one of following:
- obtaining a preconfigured reference signal resource set of an extended antenna port, wherein the reference signal resource set of the extended antenna port is used for measuring a reference signal received power (RSRP), a reference signal received quality (RSRQ), timing synchronization information or a channel statistic characteristic, and wherein a port serial number of the extended antenna port is greater than or equal to 23;
- obtaining a preconfigured coordinated multiple points (CoMP) resource management collection, wherein the CoMP resource management collection is used for measuring an RSRP or an RSRQ; and
- obtaining a preconfigured synchronization reference signal resource set, wherein the synchronization reference signal resource set is used for measuring timing synchronization information.

13. The user equipment according to claim 11, wherein,
- the obtaining unit is further configured to obtain an antenna port group corresponding to the at least one antenna port indicated by each first reference signal resource, and a port number or a port serial number of an antenna port comprised in the antenna port group;
- the processor is further configured to determine the at least one antenna port indicated by each first reference signal according to the antenna port group, and the port number or the port serial number of the antenna port comprised in the antenna port group.

14. The user equipment according to claim 10, wherein, the obtaining module is further configured to obtain a preconfigured second reference signal resource set; or the receiver is further configured to receive a second reference signal resource set transmitted by a base station.

15. The user equipment according to claim 10, wherein the co-location assumption process executed by the processor comprises assuming that at least one following item is the same:
- a geographical position of an antenna port;
- a reference signal power corresponding to an antenna port received by a terminal;
- a transmitting power of reference signal corresponding to an antenna port;
- an antenna gain experienced by a reference signal corresponding to an antenna port;
- a large scale fading experienced by a reference signal corresponding to an antenna port;
- a channel statistic characteristic, including a power delay profile PDP, experienced by a reference signal corresponding to an antenna port;
- a time that a reference signal corresponding to an antenna port arrives at a terminal;
- a transmitting time of a reference signal corresponding to an antenna port; and
- a transmitting frequency of a reference signal corresponding to an antenna port.

16. A base station, comprising:
- a processor, configured to determine a first reference signal resource set, wherein the first signal resource set comprises at least one first reference signal resource; and
- a transmitter, configured to transmit the first reference signal resource set to a user equipment (UE), to enable the UE to execute a co-location assumption process for at least one antenna port indicated by each first reference signal resource;
- wherein the processor is further configured to determine a second reference signal resource set, wherein the second signal resource set comprises at least one second reference signal resource;
- the transmitter is further configured to send the second signal resource set to the UE, to enable the UE to not execute a co-location assumption process for an antenna port comprised in at least one antenna port indicated by each second reference signal resource.

17. The base station according to claim 16, wherein the determining the first reference signal resource set by the processor, comprises at least one of the following:
- determining a reference signal resource set of an extended antenna port, wherein the reference signal resource set of the extended antenna port is used for measuring a reference signal received power (RSRP), a reference signal received quality (RSRQ), timing synchronization information or a channel statistic characteristic, a port serial number of the extended antenna port is greater than or equal to 23;
- determining a coordinated multiple points (CoMP) resource management collection, wherein the CoMP resource management collection is used for measuring an RSRP or an RSRQ; and
- determining a synchronization reference signal resource set, wherein the synchronization reference signal resource set is used for measuring timing synchronization information.

18. The base station according to claim 16, wherein the transmitter is further configured to
- transmit to the UE an antenna port group corresponding to at least one antenna port indicated by each first reference signal resource, and a port number or a port serial number of an antenna port comprised in the antenna port group, to enable the UE to determine the at least one antenna port indicated by each first reference signal resource according to the antenna port group, and the port number or the port serial number of the antenna port comprised in the antenna port group.

* * * * *